No. 615,145. Patented Nov. 29, 1898.
W. W. DINGEE.
STRAW STACKER.
(Application filed Aug. 8, 1898.)
(No Model.) 6 Sheets—Sheet 1.
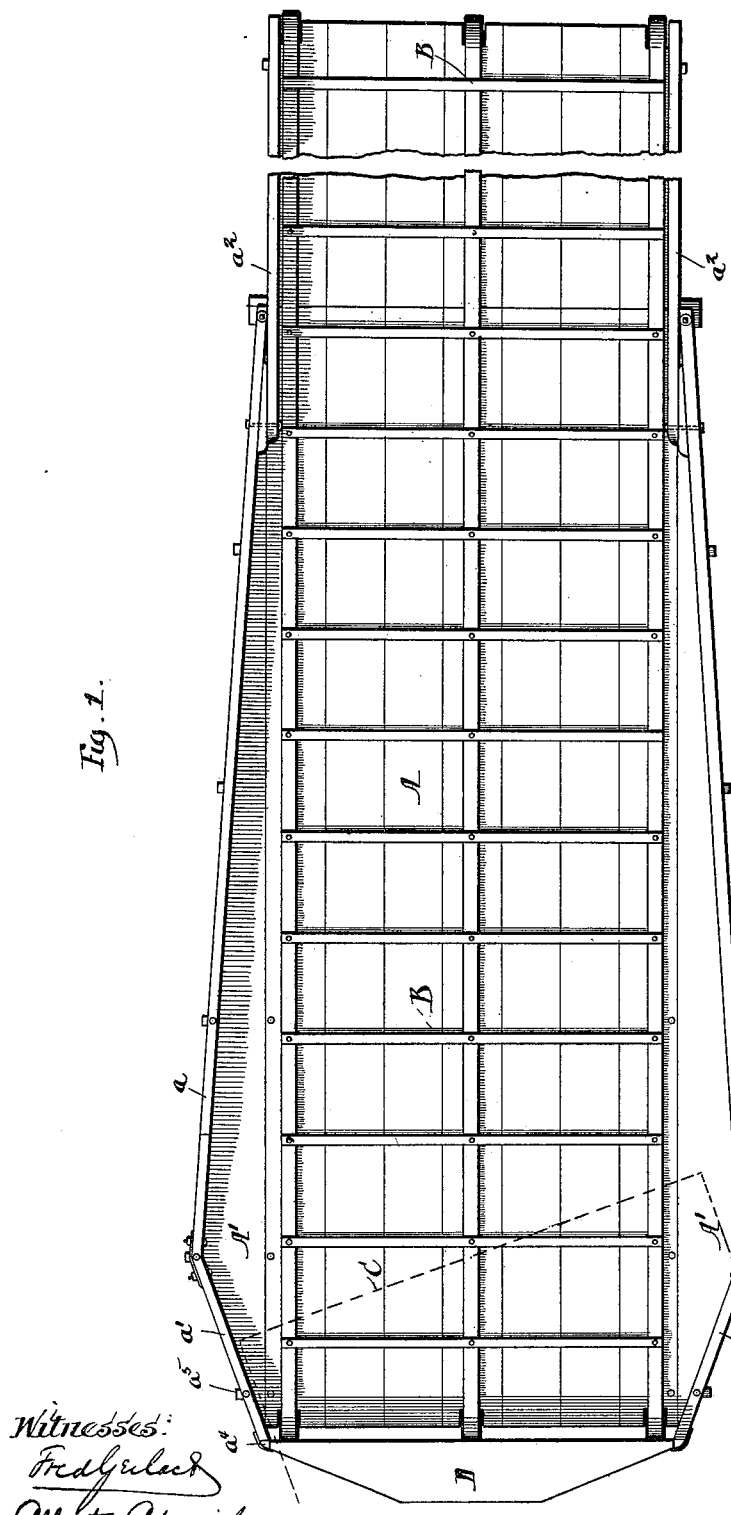
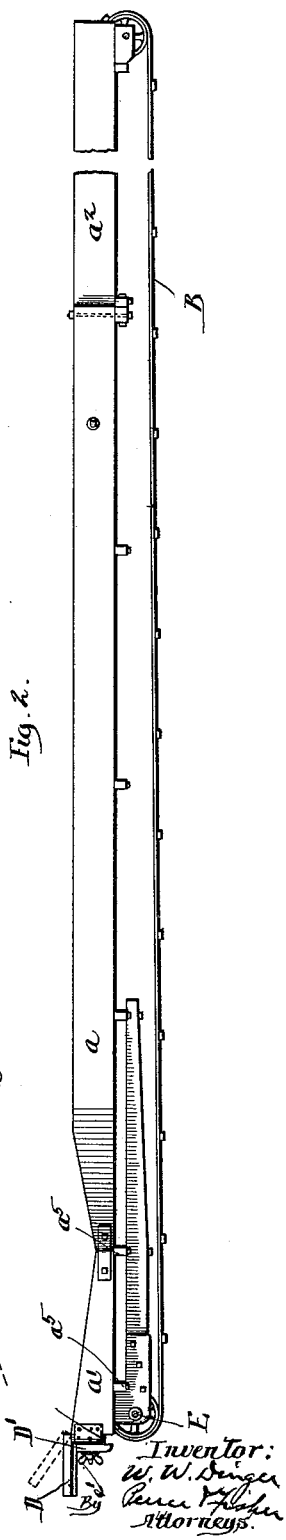
Witnesses: Inventor:
W. W. Dingee
By
Attorneys.

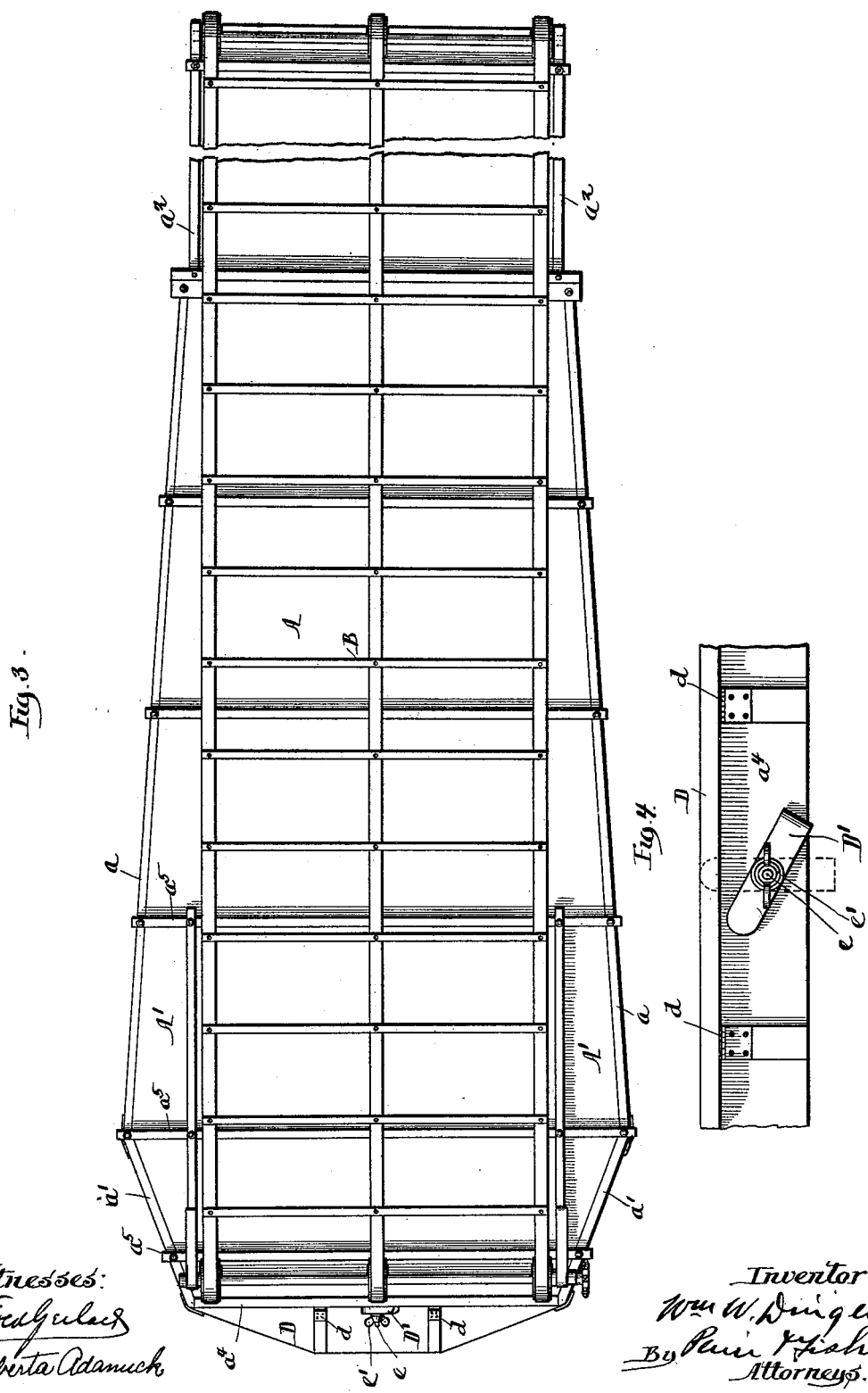

No. 615,145. Patented Nov. 29, 1898.
W. W. DINGEE.
STRAW STACKER.
(Application filed Aug. 8, 1898.)
(No Model.) 6 Sheets—Sheet 3.
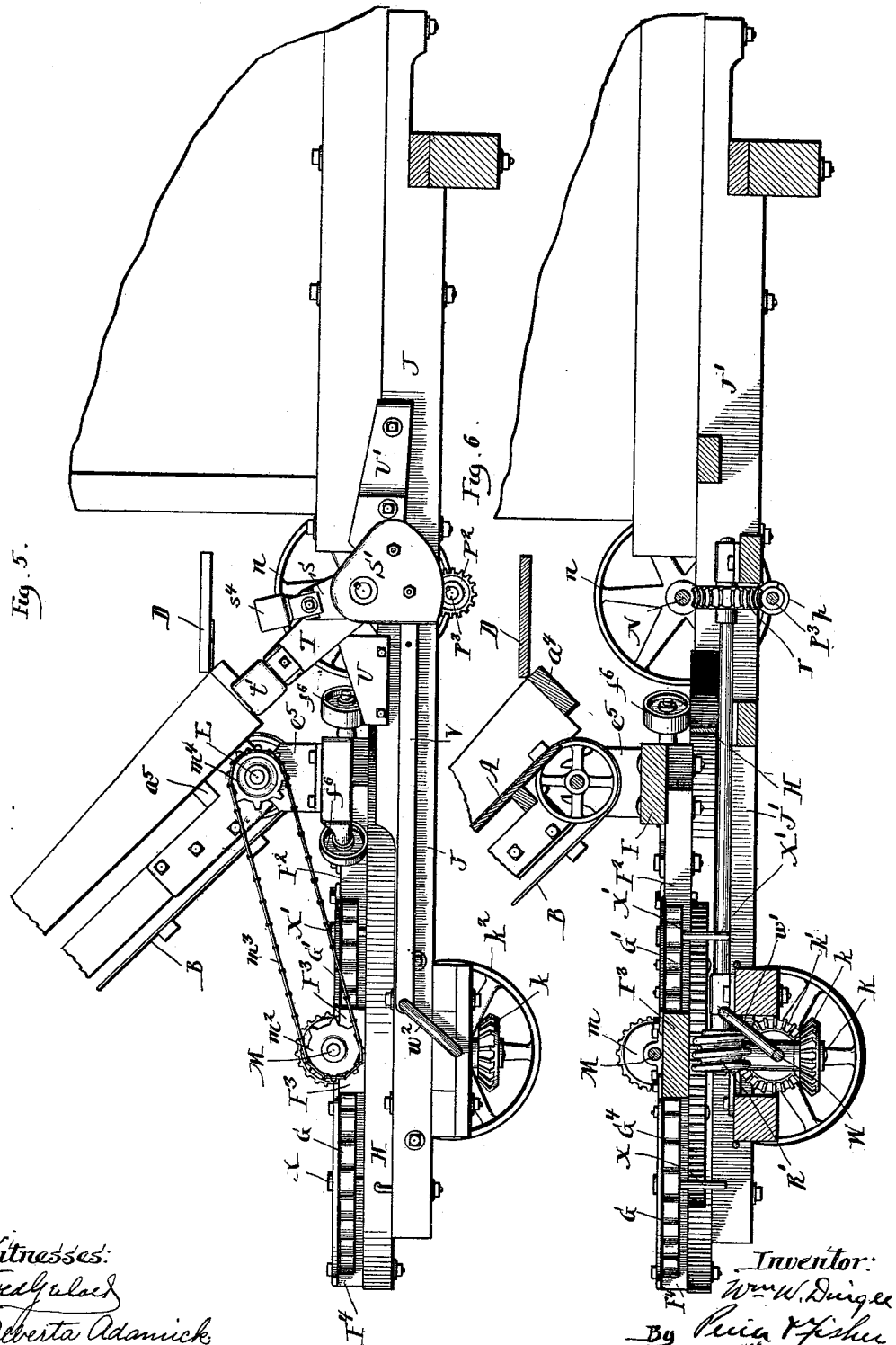

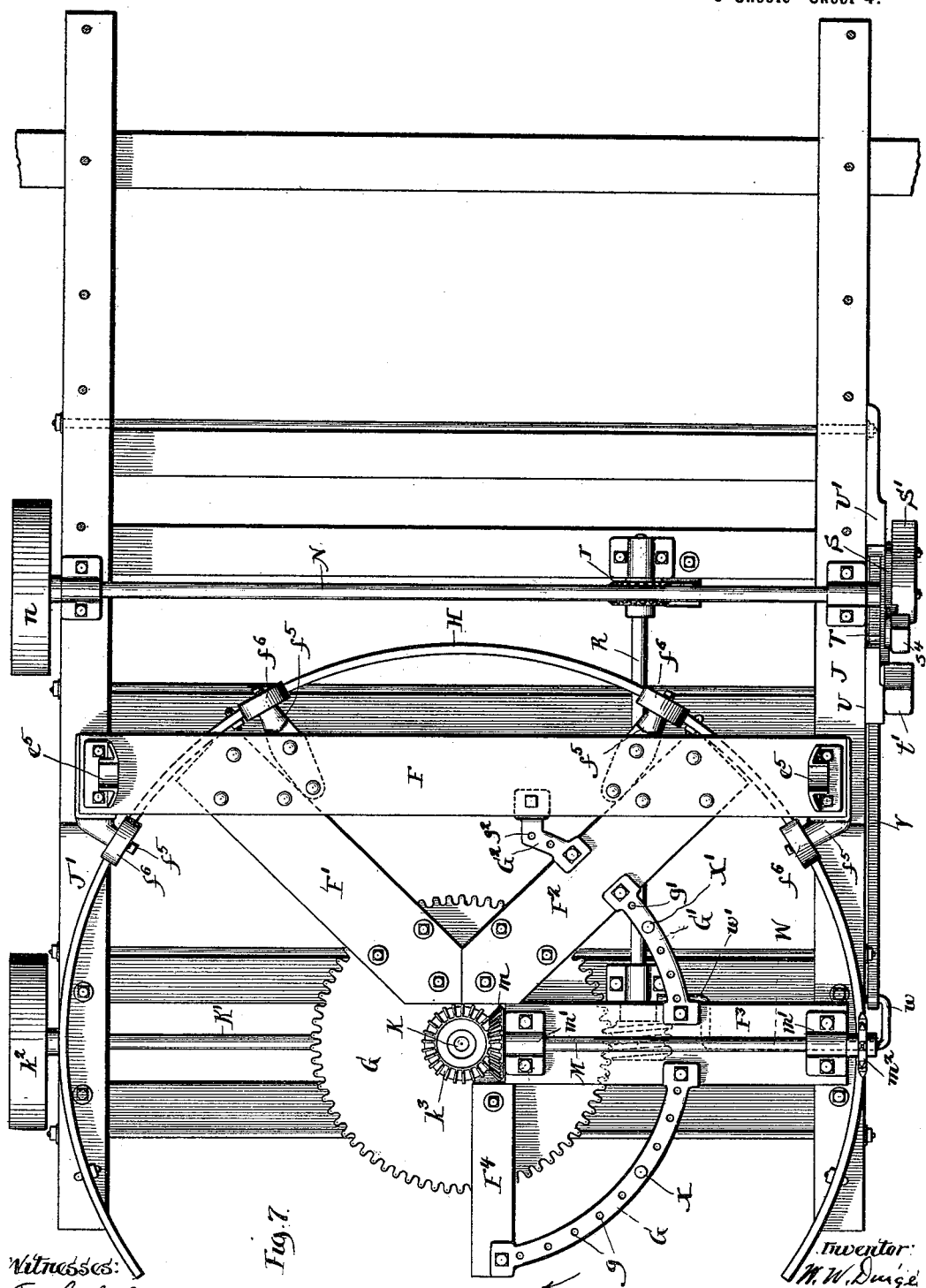

No. 615,145. Patented Nov. 29, 1898.
W. W. DINGEE.
STRAW STACKER.
(Application filed Aug. 8, 1898.)

(No Model.) 6 Sheets—Sheet 5.

Witnesses:
Fred Gerlach
Alberta Adamick

Inventor:
Wm. W. Dingee
By Penn & Fisher
Attorneys.

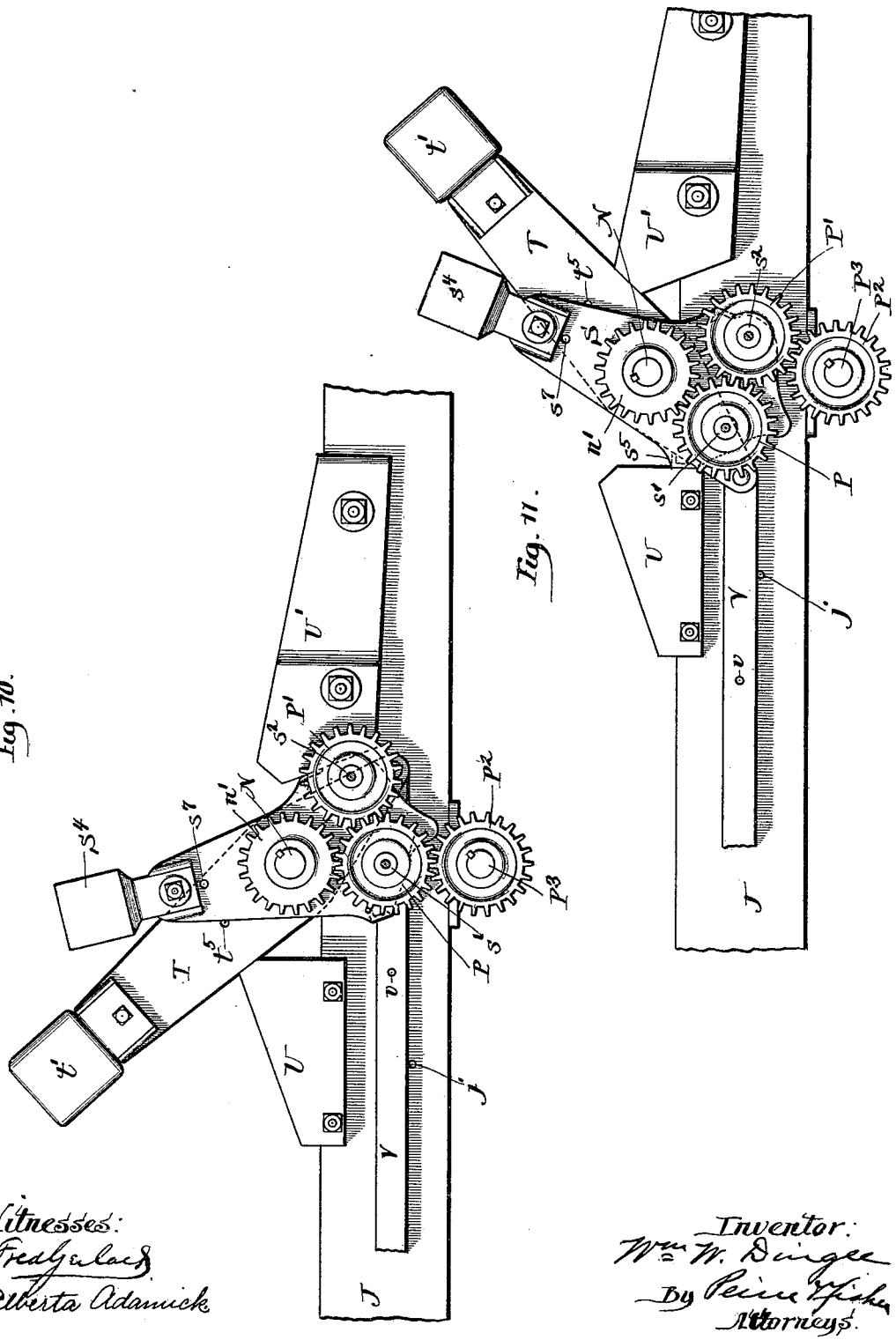

UNITED STATES PATENT OFFICE.

WILLIAM W. DINGEE, OF RACINE, WISCONSIN, ASSIGNOR TO THE J. I. CASE THRESHING MACHINE COMPANY, OF SAME PLACE.

STRAW-STACKER.

SPECIFICATION forming part of Letters Patent No. 615,145, dated November 29, 1898.

Application filed August 8, 1898. Serial No. 688,103. (No model.)

*To all whom it may concern:*

Be it known that I, WILLIAM W. DINGEE, a resident of Racine, Racine county, Wisconsin, have invented certain new and useful Improvements in Straw-Stackers, of which the following is hereby declared to be a full, clear, and exact description.

The present invention has relation more particularly to that class of stackers commonly known as "swinging" stackers that receive the straw as it issues from the threshing-machine and deliver the same at different points along the stack.

The invention contemplates various features of improvement, all of which will be hereinafter described, illustrated in the accompanying drawings, and particularly pointed out in the several claims at the end of this specification.

Figure 8:
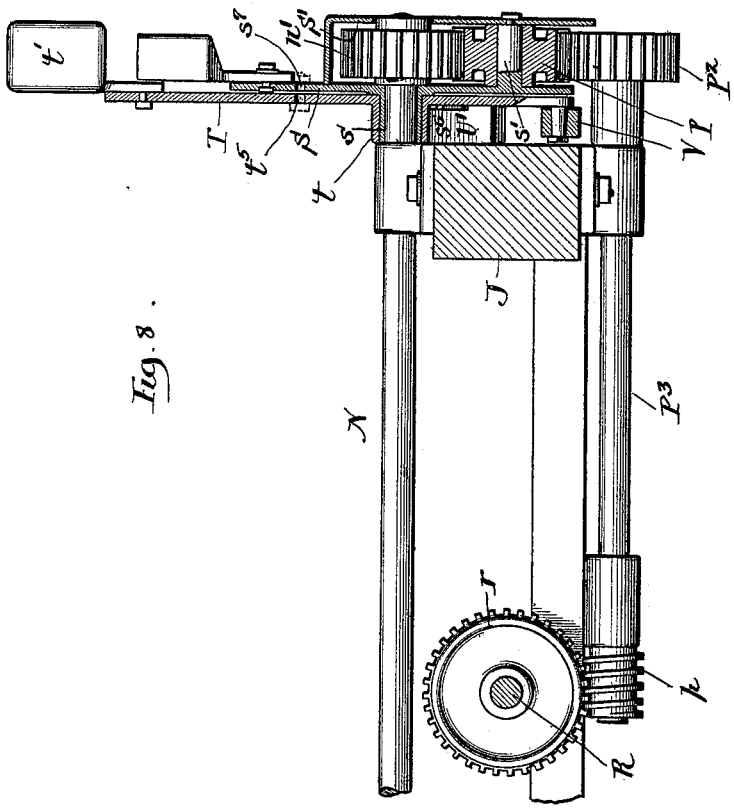
Figure 9:
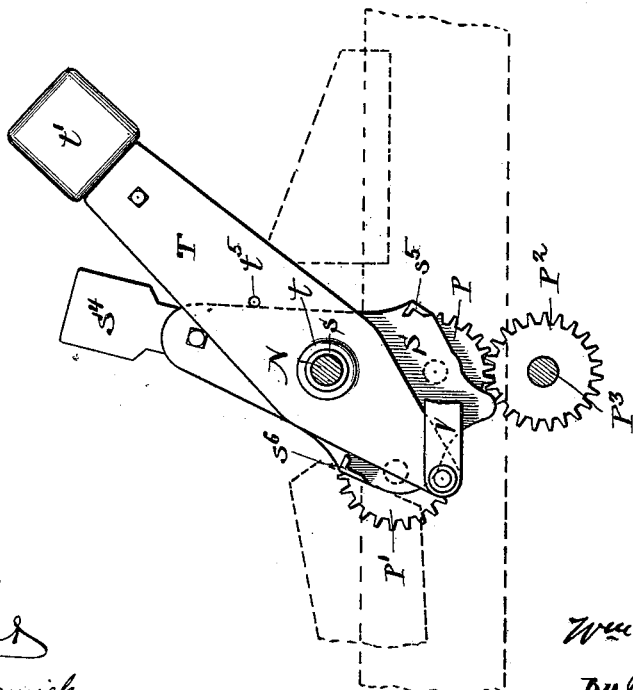

Figure 1 is a detail plan view of the carrier and its supporting-frame. Fig. 2 is a view in side elevation of the parts shown in Fig. 1. Fig. 3 is an inverted plan view of the carrier and its supporting-frame. Fig. 4 is a detail view showing the manner of supporting the end board of the carrier-frame. Fig. 5 is a view in side elevation of the stacker-truck and turn-table and parts sustained thereby. Fig. 6 is a view in vertical longitudinal section on line 6 6 of Fig. 7. Fig. 7 is a plan view of the truck and oscillating platform, the stacker mechanism being removed. Fig. 8 is an enlarged detail view, partly in elevation and partly in vertical section, showing the shifting gears and connected parts. Fig. 9 is a view in side elevation, looking outward, of the weighted shifting arms and the gears operated thereby. Fig. 10 is a view in side elevation, looking toward the machine, of the weighted shifting arms and gears controlled thereby. Fig. 11 is a view similar to Fig. 10, showing the parts in different position.

In the accompanying drawings I have shown my improvements as applied to a stacker directly attached to the rear end of a threshing-machine; but it is to be understood that the invention is quite as applicable to that type of stackers that are carried upon their own supporting-trucks independently of the threshing-machine.

One of the objects of the present invention is to improve the construction of the carrier-supporting frame, so that as the frame is swung from side to side in building the stack the straw will be received by the frame regardless of the varying position of the frame with respect to the delivery end of the threshing-machine. This object of my invention I have accomplished by forming the carrier-supporting frame with lateral extensions at each side of the carrier about its lower end, so that as the carrier is swung back and forth in the building of the stack all the straw from the threshing-machine will with certainty be received by the carrier and its supporting-frame. In this connection also my invention comprises the provision of an adjustable end board to insure the better delivery of the straw to the carrier.

The body A of the carrier-supporting frame is of usual or suitable construction, being provided at its ends with pulleys, over which passes the carrier B, of usual construction. Adjacent its delivery end the carrier-supporting frame is formed with the lateral extensions A'. These lateral extensions A' are broadest at a short distance from the delivery end of the frame and about opposite the point at which the straw is delivered from the tail end of the threshing-machine. The extensions A' from their broadest points taper toward the discharge end of the supporting-frame and taper or curve more abruptly toward the delivery end. At the sides of the extensions A' rise the side boards $a$ and $a'$, the outer ends of the side boards $a$ being bolted to the usual side boards $a^2$, between which the conveyer B travels. The side boards $a'$ at the inner ends of the extensions A' are fastened to the vertical end bar $a^4$ and are bolted also to a cross-bar $a^5$, that extends beneath the inner end of the carrier-frame. For most effective work the discharge end or conveyer of the threshing-machine is about the same width as the carrier B, and when the carrier-supporting frame is in straight line with the threshing-machine the straw will all fall upon the carrier; but in prior constructions in which the carrier-supporting frame is about the same width as the carrier it has been found that when the carrier and its frame are swung to one side or the other there is danger of more or less straw escaping over the sides of the carrier and its frame. It is for this reason that I have provided the inner end of the carrier-supporting frame with lateral extensions, so that even when the carrier and its frame are swung to their extreme positions all the straw will be delivered onto the carrier and its frame and will be delivered to the stack. Thus by reference to Fig. 1 of the drawings it will be seen that if the dotted line C is assumed to represent the position of the delivery end of the threshing-machine when the carrier and its supporting-frame are swung toward the extreme right it will still be found that the straw will all be caught by the carrier and its frame, whereas if the extensions A' are not provided portions of the straw will be apt to fall at the sides of the carrier-supporting frame.

In order to prevent the straw from dropping from the inner or delivery end of the carrier-supporting frame, I provide the adjustable end board D. This board D is preferably hinged, as at $d$, to the end of the carrier-supporting frame, and by preference the board D is sustained in different positions by means of an adjustable support or button D', that is held in different positions by means of a bolt $e$ and thumb-nut $e'$. At the beginning of the operation of forming a stack the board D will occupy substantially the position shown by full lines in Fig. 2; but as the carrier-supporting frame is elevated at its outer end, thereby depressing its inner end, the board D will be turned toward the position shown by dotted lines in Fig. 2, thus in a measure closing the space between the inner end of the carrier-supporting frame and at the discharge end of the threshing-machine, and so preventing all danger of straw falling over the inner end of the carrier-frame.

Another important feature of the present invention consists in providing improved mechanism whereby the automatic swinging of the carrier and its supporting-frame will be effected. The drive-shaft E at the inner or lower end of the carrier-frame is shown as mounted in bearing posts or brackets $e^5$, (see Figs. 5 and 7,) mounted upon the ends of the transverse sill F. From the sill F extend the diagonal beams F' F$^2$, the inner ends of which are bolted to the gear-wheel G$^4$. To the gear-wheel G$^4$ are also bolted a beam F$^3$ and a short beam F$^4$. The beams F$^3$ and F$^4$ are connected by a segment-bar G, having holes $g$ therein, and the beams F$^2$ and F$^3$ are connected by a segment-bar G', that is provided with holes $g'$. The beams F, F', F$^2$, F$^3$, and F$^4$ constitute the platform that supports the carrier and its frame, and to the under side of the beam F are bolted brackets $f^5$, carrying friction-rolls $f^6$, adapted to travel upon a circular supporting-rail H, that is mounted upon the side bars J J' of the main truck. Through a depending sleeve or hub of the gear-wheel G extends the shaft K, upon the lower end of which is fixed the beveled pinion $k$, that meshes with the corresponding beveled pinion $k'$ upon a shaft K', the shaft K' being extended to one end of the machine and having its outer end provided with a belt-pulley $k^2$, to which power is applied. The upper end of the vertical shaft K carries a beveled pinion $k^3$, that engages a beveled pinion $m$, keyed to the end of a shaft M, that is journaled within bearings $m'$ upon the top of the beam F$^3$. The outer end of the shaft M has fixed thereto a sprocket-wheel $m^2$, from which motion will be transmitted by a sprocket-chain $m^3$ to a sprocket-wheel $m^4$ on the end of the shaft E, whereby the carrier B is continuously driven.

A shaft N, journaled upon the side bars J J' of the truck-frame, is provided at one end with a belt-pulley $n$, whereby the shaft is constantly driven, and at its opposite end the shaft N carries a pinion $n'$, through the medium of which the swinging movement is imparted to the carrier and its frame, as will presently appear. With the pinion $n'$ may be connected, by either the pinion P or the pinion P', the pinion P$^2$ at the end of a shaft P$^3$, journaled in suitable hangers beneath the truck, (see Fig. 8,) and the shaft P$^3$ is provided with a worm $p$, that engages a worm-wheel $r$ on the shaft R, (see Figs. 6, 7, and 8,) that is journaled in suitable bearings $r'$ upon the cross-sills of the main-truck frame. The opposite end of the shaft R is provided with a worm-wheel R', that engages the teeth of the gear-wheel G. Hence, it will be seen that when power is imparted to the shaft N from the belt-pulley $n$, the pinion $n'$ may impart revolution to the pinion P$^2$ either through the medium of the pinion P or through the medium of the pinion P' according as the one or the other of these pinions connects the pinions P' and P$^2$, and revolution will thus be imparted to the shaft P$^3$ and through the worm $p$ and worm-wheel $r$ to the shaft R, and thence through the worm R' and the gear-wheel G to the turn-table, whereon the carrier and its frame are sustained. If the pinions P and P' (see Fig. 10) are shifted to such position that neither of these pinions engages with the pinion P$^2$, then manifestly no movement will be transmitted from the constantly-revolving shaft M, and hence no swinging movement will be imparted to the carrier and its supporting-frame.

The improved mechanism for imparting the automatically reversing or swinging movement of the carrier and its frame will next be described. By reference more particularly to Figs. 8 to 11 it will be seen that the outer end of the shaft N passes through a journal hub or bearing $s$, formed at one side of the pinion-supporting frame S, the shaft N thus serving to sustain the frame S and the pinions carried thereby. As shown, the frame S carries journal-studs $s'$ and $s^2$, upon which, respectively, are journaled the pinions P and P'. A hood or casing S', that is fixed to the ends of the studs $s'$ and $s^2$, is shown in Figs. 5, 7, and 8 as inclosing the pinions, although this is not essential. To the upper end of the pinion-frame S is attached a weight $S^4$, the purpose of which will presently appear. Upon the hub $s$ of the pinion-shifting frame S (see Fig. 8) is mounted the hub $t$ of the weighted arm T, this arm carrying at its free upper end a weight $t'$. Suitable stop-plates U U', that rise from the side beam J of the main-truck frame, limit the swinging movements of the weighted arm T. Upon the inner face of the shifting frame S (see Fig. 9) are formed lugs or offsets $s^5$ $s^6$, that will be engaged by the lower end of the weighted arm T, so that said arm shall serve at the extremes of its movement to shift the frame S, as will presently more fully appear. The lower end of the arm T has connected thereto one end of a rod V, the opposite end of this rod being connected to the outer cranked end $w$ of the shaft W, this shaft being journaled in suitable bearings beneath the beam $F^3$. (See Figs. 5, 6, and 7.) The inner end of the shaft W is formed with a crank $w'$, that extends upwardly and into position to be engaged by the pins X and X', that pass through the holes $g$ and $g'$, respectively, of the segment-plates G and G'.

The operation of the last-described mechanism will be seen to be as follows: If it be assumed that the parts are in the position shown by Figs. 5, 9, and 10 of the drawings, then it will be seen that motion will be imparted from the drive-shaft N, through the pinion $n'$, the pinion P, and the pinion $P^2$, to the shaft $P^3$, and thence by the worm and pinion $p$ $r$, shaft R, worm R', and gear-wheel G to the turn-table, whereon the carrier and its supporting-frame are sustained, and the turn-table will thus be swung in the direction of the arrow, Fig. 7. The turn-table, the carrier, and its frame will thus continue to be moved until the pin X' contacts with the crank-arm $w'$ of the shaft W, thereby rocking said shaft and causing its outer crank-arm $w$, through the medium of the connecting-rod V, to gradually turn the weighted arm T about the shaft N as the center. As soon as the weighted arm T passes across the top of the shaft N its weighted upper end $t'$ will drop suddenly, and this will occur at the time that the turn-table has completed its predetermined extent of movement. When the weighted arm T thus drops, its lower end will contact with the stop or lug $s^5$ (see Fig. 9) on the lower part of the shifting frame S, and the frame S will thus be turned about the shaft N as a center and will throw the pinion P out of engagement and the pinion P' into engagement with the pinion $P^2$. Inasmuch as the pinion $P^2$ will then be driven through both of the pinions P and P' as a train, it is obvious that the direction of revolution of the pinion $P^2$ will be reversed, and consequently the turn-table, the carrier, and its supporting-frame will be swung in opposite direction from that indicated by the arrow in Fig. 7. During the reverse movement of the turn-table the weighted arm T and the swinging frame S will remain in the position last described, being that illustrated in Fig. 11, until the pin X contacts with the crank-arm $w'$ of the shaft W and causes the rod V to turn the weighted arm T so far about its pivot-point that the weighted upper end of the arm will drop by gravity and cause the lower end of the arm T to contact with the stop or lug $S^6$ on the shifting frame S (see Fig. 9) and thus restore the direct engagement of the pinion P with the gear-pinion $P^2$, as shown in Fig. 10.

It is sometimes desirable to throw the mechanism that swings the turn-table that sustains the carrier out of action. For this reason I have formed a hole $t^5$ in the weighted arm T and a corresponding hole $s^7$ in the shifting frame S, and in like manner the connecting-rod V is formed with a hole $v$, adapted to be brought coincident with the hole $j$ formed in the side bar J of the main truck. When the mechanism that swings the carrier is to be thrown out of action, the holes $t^5$ and $s^7$ will be brought coincident and a suitable bolt or pin will be passed therethrough, and in like manner a hole $v$ will be brought coincident and a pin inserted therethrough, so as to rigidly hold the rod V. When the parts are brought to this position, neither of the pinions P and P' will engage the pinions $P^2$, and consequently revolution will not be imparted from the shaft N to the shaft $P^3$. Hence it will be seen that at such time the mechanism whereby the carrier and its supporting-frame are swung from side to side will be thrown out of action.

It is manifest that the precise details of construction above set out may be varied by the skilled mechanic without departure from the spirit of the invention.

Having thus described my invention, what I claim as new, and desire to secure by Letters Patent, is—

1. In a stacker the combination with the endless carrier, of a carrier-supporting frame having its straw-receiving end provided with lateral extensions.

2. In a stacker the combination with the endless carrier, of a carrier-supporting frame having its straw-receiving end provided with lateral extensions tapering toward the opposite ends of the supporting-frame, said extensions being broadest about the point at which the straw will be delivered to the carrier.

3. In a stacker, the combination with the carrier-supporting frame, of an adjustable end board projecting from the straw-receiving end of the supporting-frame.

4. In a swinging stacker the combination with the turn-table or support whereon the carrier and its frame are mounted and with the driving mechanism for operating said turn-table or support, of a driving-pinion connected with the source of power, a driven pinion connected with the gear mechanism that operates the turn-table, a pair of shiftable pinions either of which may engage said driven pinion, a shifting frame carrying said pair of pinions and suitable means whereby said shifting frame is operated from the turn-table to throw said pinions alternately into engagement with the driven pinion.

5. In a swinging stacker, the combination with the turn-table or support whereon the endless carrier and frame are mounted, and with gear mechanism for operating said turn-table, of a driving-pinion connected with the source of power, a driven pinion connected with the gear mechanism that operates the turn-table, a pair of shiftable pinions either of which may engage said driven pinion, a shifting frame whereby said pair of pinions is carried, a pivoted weighted arm arranged in proximity to said shifting frame, means whereby said weighted arm at the extremes of its movement shall move said shifting frame, and suitable means whereby said weighted arm is operated as the turn-table or support is to be reversed.

6. In a swinging stacker, the combination with the turn-table or support whereon the endless carrier and its frame are mounted and with gear mechanism for operating said turn-table, of a driving-pinion connected with the source of power, a driven pinion connected with the gear mechanism that operates the turn-table, a pair of shiftable pinions either of which may engage said driven pinion, a shifting frame carrying said pair of pinions, a pivoted weighted arm arranged in proximity to said shifting frame and adapted to move independently thereof during a part of its movement, but to engage and shift said frame at the extremes of its movement, and means whereby said weighted arm is automatically turned about its pivot-point as the turn-table approaches the extremes of its movement.

7. In a swinging stacker, the combination with the turn-table or support whereon the endless carrier and its frame are mounted, and with gear mechanism for operating said turn-table, of a driving-pinion suitably connected with the source of power, a driven pinion connected with the gear mechanism that operates the turn-table, a pair of shiftable pinions either of which may engage said driven pinion, a shifting frame carrying a pair of pinions and pivotally mounted upon the shaft of the driving-pinion and suitable mechanism for moving said shifting frame to cause the pinions carried thereby to alternately engage the driven pinion.

8. In a swinging stacker, the combination with the turn-table or support whereon the endless carrier and its frame are mounted and with gear mechanism for operating said turn-table, of a driving-pinion suitably connected with the source of power, a driven pinion connected with the gear mechanism that operates the turn-table, a pair of shiftable pinions either of which may engage the driven pinion, a shifting frame carrying said pair of pinions and mounted upon the shaft of the driving-pinion, a pivoted weighted arm also mounted upon the shaft of said driving-pinion, suitable stops or offsets whereby said weighted arm as it approaches the extremes of its movement will engage said shifting frame, and suitable mechanism whereby said weighted arm is operated from the turn-table.

9. In a swinging stacker, the combination with the turn-table or support whereon the endless carrier and its frame are mounted and with gear mechanism for operating said turn-table, of a driving-pinion suitably connected with the source of power, a driven pinion connected with the gear mechanism that operates the turn-table, a pair of shiftable pinions either of which may engage said driven pinion, a shifting frame carrying said pair of pinions, a pivoted weighted arm arranged to engage said shifting frame, a shifting rod connected to said weighted arm, a crank-shaft connected to said shifting rod and suitable means whereby said crank-shaft is operated from the turn-table.

10. In a swinging stacker, the combination with the turn-table or support whereon the endless carrier and its frame are mounted and with gear mechanism for operating said turn-table, of a driving-pinion suitably connected with the source of power, a driven pinion connected with the gear mechanism that operates the turn-table, a pair of shiftable pinions either of which may engage said driven pinion, a shifting frame carrying said pair of pinions, a weighted arm whereby said shifting frame is operated, suitable connections between said weighted arm and the turn-table, said weighted arm and said shifting frame being provided with means whereby said parts may be secured together at such points as to hold said pair of pinions disengaged from said driven pinion.

WILLIAM W. DINGEE.

Witnesses:
WARREN E. FISH,
OWEN P. GRAHAM.